(12) United States Patent
Azizi et al.

(10) Patent No.: US 7,978,780 B2
(45) Date of Patent: Jul. 12, 2011

(54) ADAPTIVE CYCLIC DELAY DIVERSITY FOR MOBILE DEVICES

(75) Inventors: Shahmaz Azizi, Portland, OR (US); Raymond Blackham, Penn Valley, CA (US)

(73) Assignee: Intel Corporation, Santa Clara, CA (US)

( * ) Notice: Subject to any disclaimer, the term of this patent is extended or adjusted under 35 U.S.C. 154(b) by 805 days.

(21) Appl. No.: 11/860,321

(22) Filed: Sep. 24, 2007

(65) Prior Publication Data
US 2009/0080543 A1 Mar. 26, 2009

(51) Int. Cl.
*H04B 7/02* (2006.01)

(52) U.S. Cl. ........ 375/267; 375/260; 375/299; 375/332; 375/347; 375/348; 375/349; 375/346

(58) Field of Classification Search .................. 375/267, 375/260, 299, 347, 349, 296, 232, 348, 346
See application file for complete search history.

(56) References Cited

U.S. PATENT DOCUMENTS

| 6,658,045 | B1 | 12/2003 | Jin | |
|---|---|---|---|---|
| 2005/0281240 | A1* | 12/2005 | Oh et al. | 370/343 |
| 2006/0077886 | A1* | 4/2006 | Oh et al. | 370/208 |
| 2007/0098097 | A1* | 5/2007 | Khan et al. | 375/260 |
| 2008/0049672 | A1* | 2/2008 | Barak et al. | 370/330 |

OTHER PUBLICATIONS

Zhang et al. (Diversity Gain for DVB-H by using Transmitter/Receiver Cyclic Delay Diversity, IEEE Transactions on Broadcasting, vol. 52, No. 4, Dec. 2006, pp. 464-474).*
Bossert et al., "On Cyclic Delay Diversity in OFDM Based Transmission Schemes," University of Ulm Department of Telecommunications and Applied Information Theory, Ulm, Germany, Siemens AG Information and Communication Mobile Networks Future Radio Concepts, Munich, Germany.
Kaiser, "Spatial Transmit Diversity Techniques for Broadband OFDM Systems," German Aerospace Center (DLR), Institute of Communications and Navigation, Oberpfaffenhofen, Germany.
"Performance of pre-coded MIMO and per group rate control for OFDMA E-UTRA," 3GPP TSG RAN WG1 #43, R1-051314, Seoul, Korea, Nov. 7-11, 2005.
Dammann et al., "Standard conformable antenna diversity techniques for OFDM and its application to the DVB-T system," Institute of Communication & Navigation, German Aerospace Center, Oberpfaffenhofen, Global Telecommunications Conference, 2001, GLOBECOM '01, IEEE, pp. 3100-3105, vol. 5, San Antonio, Texas.

* cited by examiner

*Primary Examiner* — Kabir A Timory
(74) *Attorney, Agent, or Firm* — Schwabe, Williamson & Wyatt, P.C.

(57) ABSTRACT

Embodiments of the present invention provide for adaptive cyclic delay diversity to be used in wireless transmissions to mobile devices. The cyclic delay diversity may be adapted through cyclic delay parameters determined based at least in part on a determined speed of the mobile device. Other embodiments may be described and claimed.

7 Claims, 8 Drawing Sheets

| FFT Size | 1024 |
|---|---|
| Cyclic prefix | 256 |
| Subframe duration | 0.5 ms |
| Subcarrier spacing | 15 kHz |
| Channel model | GSM TU 6-tap w/ MIMO extension<br>BS antenna correlation 0.25<br>MD antenna correlation 0 |
| Channel estimation method | Ideal |
| MD speed | 3 km/h; 30 km/h; 120 km/h |
| Packet size | 960 information bits |

ADAPTIVE CYCLIC DELAY DIVERSITY FOR MOBILE DEVICES

FIELD

Embodiments of the present invention relate to the field of wireless networks, and more particularly, to adaptive cyclic delay diversity for mobile devices used in said wireless networks.

BACKGROUND

Cyclic delay diversity (CDD) is provided in wireless communications as a method of spatially diversifying transmissions in orthogonal frequency division multiplexing (OFDM) systems. When spatial diversity is desired, e.g., when throughput conditions are compromised due to poor channel conditions, CDD may be employed. CDD provides that a signal be repeated throughout a plurality of transmit branches of a transmitting device (e.g., a base station), with each transmit branch providing a cyclic delay to the transmitted information. The cyclic delay may be provided by copying a certain number of samples from the end of the transmission and placing those samples at the beginning of the transmission. The number of samples of the cyclic delay is predetermined given the characteristics of a given platform, e.g., number of antennas. The spatial diversity provided through such a CDD transmission may increase the throughput over channels with substantial signal to noise ratios (SNRs).

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A and/or B" means "(A), (B), or (A and B)." For the purposes of the present invention, the phrase "A, B, and/or C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
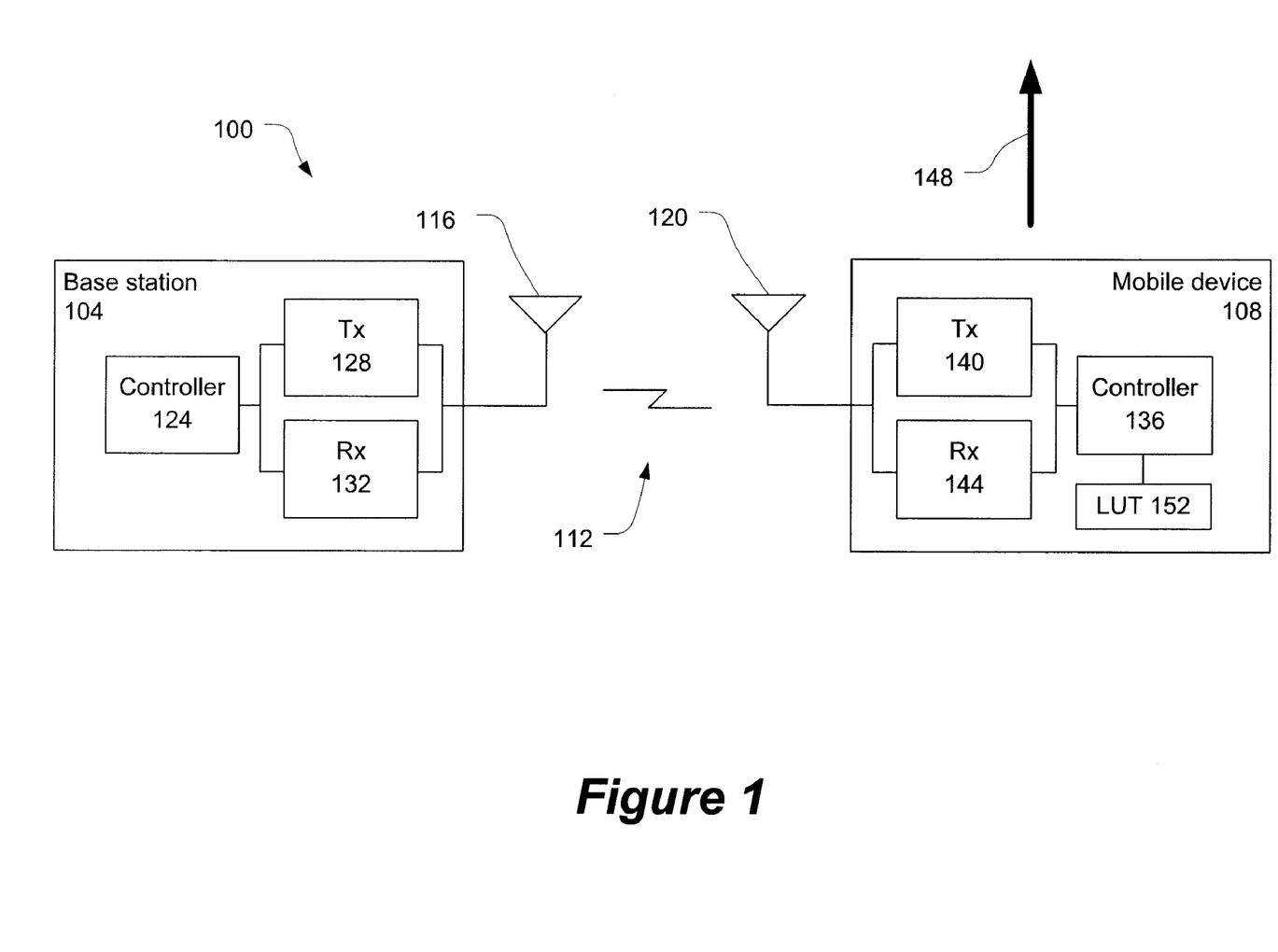
FIG. 1 illustrates a wireless communication system in accordance with various embodiments of the present invention.

FIG. 1 illustrates a wireless communication system 100 in accordance with an embodiment of this invention. In this embodiment, the communication system 100 is shown with two wireless communication devices, e.g., base station 104 and mobile device 108, communicatively coupled to one another via one or more wireless communication channels ("channels") 112.

The wireless communication devices 104 and 108 may have respective antenna structures 116 and 120 to facilitate the communicative coupling. Each of the antenna structures 116 and 120 may have one or more antennas. An antenna may be directional or omnidirectional antenna, including, e.g., a dipole antenna, a monopole antenna, a patch antenna, a loop antenna, a microstrip antenna or any other type of antenna suitable for transmission/reception of radio frequency (RF) signals.

The base station 104 may include a controller 124 coupled to a transmitter 128 and a receiver 132. If the conditions of the channels 112 deteriorate, e.g., the SNR decreases, the controller 124 may control the transmitter 128 to employ CDD to obtain spatial diversity in the transmissions to the mobile device 108 in an effort to increase throughput of the transmissions. As briefly introduced above, and discussed in further detail below, CDD may be employed by the transmitter 128 by repeating a signal through a plurality of transmit branches, within the transmitter 128, with a branch-specific cyclic delay added through each transmit branch.

The mobile device 108 may also include a controller 136 coupled to a transmitter 140 and a receiver 144. The transmitter 140 and receiver 144 may be collectively referred to as a transceiver. The mobile device may be traveling in a direction 148 at a particular speed while communicating with the base station 104. The controller 136 may determine this speed, which may thereafter serve as at least a partial basis for determining a cyclic delay parameter to be used in wireless transmissions between the base station 104 and the mobile device 108. In particular, the cyclic delay parameter may be used to adapt CDD utilized in said wireless transmissions. In one embodiment, the controller 136 may access a lookup table 152 that correlates various speeds to cyclic delay parameters, e.g., by providing throughput values for a number of different cyclic delay parameter values at different speeds of the mobile device 108.

The speed of the mobile device 108 may be determined through receipt of a speed-determinative signal. For example, the receiver 144 may include a global positioning system (GPS) receiver, controlled by the controller 136, to receive a speed-determinative signal as a series of GPS transmissions and to determine the speed of the mobile device 108. In other embodiments, the speed-determinative signal may be communications from the base station 104 and the controller 136 may determine the speed by referencing pilot symbols in said communications. Other methods for determining the speed of the mobile device may be additionally/alternatively employed in various embodiments.

In some embodiments, both the transmitting device and the receiving devices may be mobile devices. In these embodiments, it may be that speeds of both wireless communication devices are determined and factored into the determination of the cyclic delay.

In some embodiments, a direction that the mobile device is traveling may additionally/alternatively be considered when adapting CDD.

In various embodiments, the communication system 100 may be compatible with any wireless communication standards including, e.g., cellular system standards, wireless computer network standards, etc.

In various embodiments, the mobile device 108 may be a mobile computer, a personal digital assistant, a mobile phone, etc. The base station 104 may be a fixed device or a mobile device that may provide the mobile device 108 network access. The base station 104 may be a mobile computer, a personal digital assistant, a mobile phone, an access point, a base transceiver station, a radio base station, a node B, etc.

Figure 2:
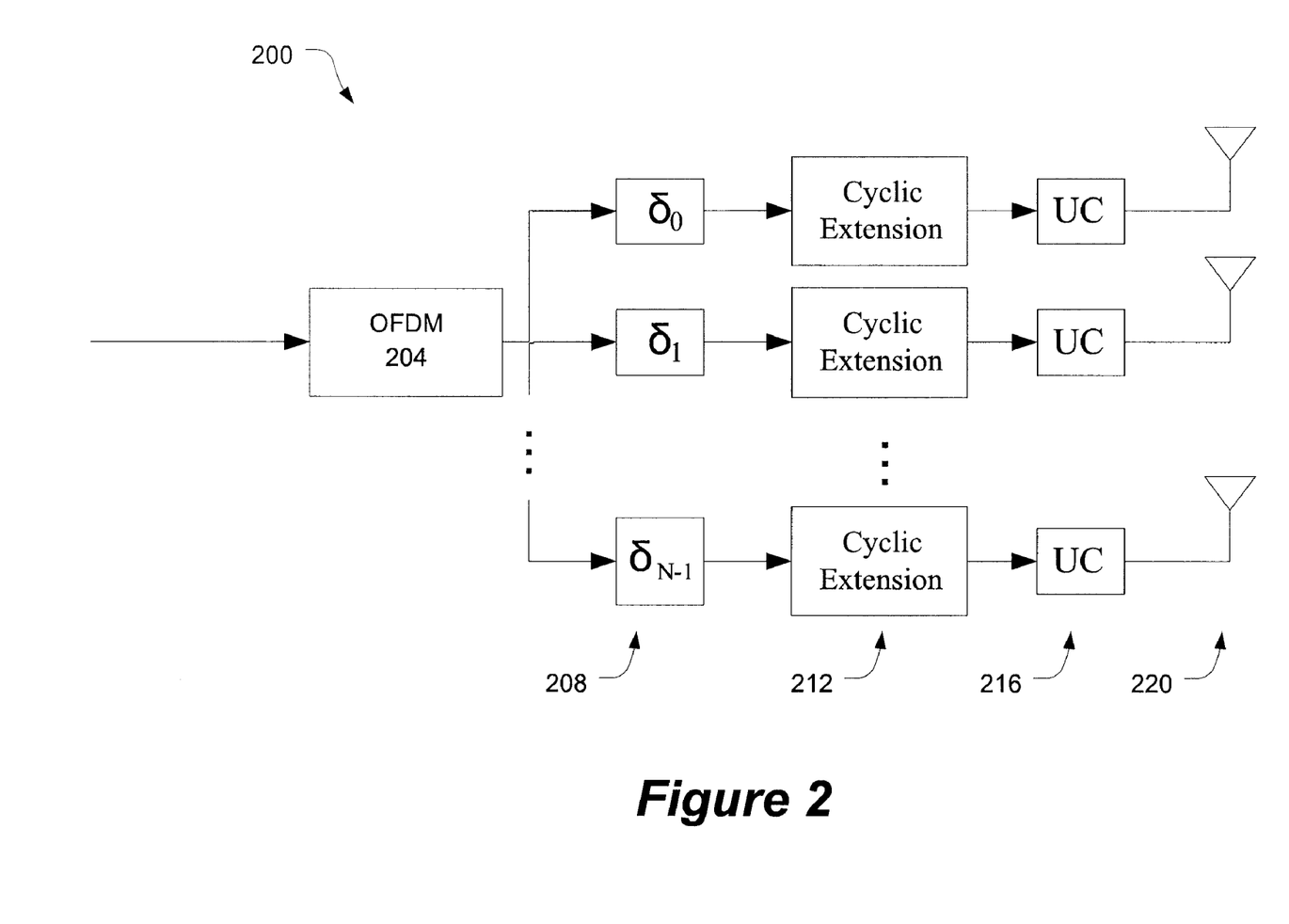
FIG. 2 illustrates an OFDM transmitter with CDD in accordance with various embodiments of the present invention.

FIG. 2 illustrates a transmitter 200 that may be used in place of transmitter 128 in accordance with various embodiments. The transmitter 200 may be an N—transmit branch OFDM transmitter with CDD. An input signal may be modulated by an OFDM module 204 into an OFDM transmission sequence (e.g., an OFDM symbol), which is then replicated to the N transmit branches. In each transmit branch, the OFDM symbol may be cyclically shifted through shift modules 208 by a branch specific cyclic delay $\delta_n$, n=0, ..., N−1 (in FIG. 2, $\delta_0$ may be assumed to be zero). A cyclic delay may be a number of inverse fast fourier transform (IFFT) samples copied from the end of the symbol and placed at the beginning.

This cyclical shifting utilizing the cyclic delay in a time domain is one example of implementing CDD. Other examples of implementing CDD may include, e.g., a phase rotation ramp in a frequency domain. Accordingly, in various embodiments, CDD may be implemented by feeding back a cyclic delay parameter that may be either a cyclic delay or a phase rotation ramp. Additionally, one type of cyclic delay parameter may be used to derive the other. For example, a phase rotation ramp may be fed back and used by the transmitter to determine the cyclic delay to use in CDD. Either types of the cyclic delay parameter may be fed back as a single number to limit consumption of bandwidth. Discussion of one type of cyclic delay parameter may apply equally well to the other of cyclic delay parameter with appropriate modifications.

Following the cyclic shifting, the symbols may have extensions added through cyclic extension modules 212, to mitigate for intersymbol interference, and upconverted through upconverting modules 216. The symbols may then be transmitted via antennas 220.

Figure 3:
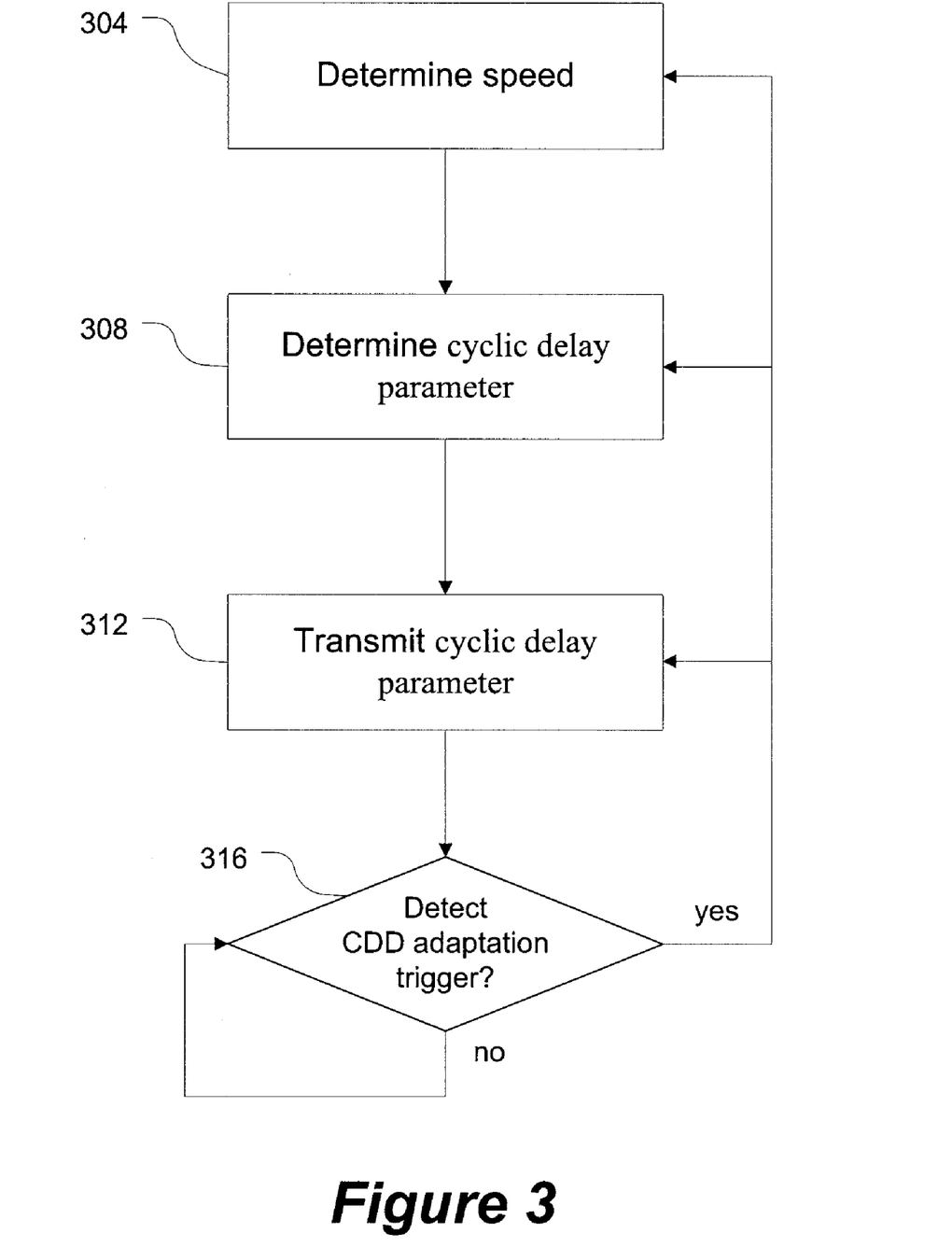
FIG. 3 illustrates adaptation of CDD in accordance with various embodiments of the present invention.

FIG. 3 illustrates an adaptation of CDD in accordance with various embodiments. The controller 136 may determine a speed at which the mobile device 108 is traveling at block 304. As discussed above, the controller 136 may determine the travel speed through any of a number of mechanisms. Having determined the speed, the controller 136 may determine a cyclic delay parameter, e.g., cyclic delay $\delta_r$, to be used in time period t at block 308. This cyclic delay parameter may then be transmitted to a transmitting device, e.g., the base station 104. The base station 104 may then use the cyclic delay parameter for CDD transmissions to the mobile device 108.

The mobile device 108 may then detect for a CDD adaptation trigger at block 316 and, when detected, loop back to block 304 for a repeated determination of the speed of the mobile device 108. In some embodiments, a CDD adaptation trigger may be time-based, e.g., expiration of the time period t. In other embodiments, a CDD adaptation trigger may be event-based, e.g., detecting a change of speed of a predetermined magnitude.

In embodiments utilizing the speed of the mobile device 108 as an event-based CDD adaptation trigger, the detection of the CDD adaptation trigger at block 316 may include a repeated determination of the speed so that the current speed of the mobile device 108 may be considered. The process may then loop back from block 316 to block 308.

In another embodiment, an event-based CDD adaptation trigger may be the determination of a different cyclic delay parameter, e.g., cyclic delay $\delta_r$. That is, the speed and the resulting cyclic delay parameter may be repeatedly determined and, when the speed changes in such a degree there is also a change in the corresponding cyclic delay parameter, the updated cyclic delay parameter (or its difference with the previously determined value) may be transmitted. In this embodiment, the detection of the CDD adaptation trigger at block 316 may include the repeated determination of the speed and cyclic delay parameter. The process may then loop back from block 316 to block 312.

Thus, in various embodiments a CDD adaptation trigger may instigate, or be the result of, repeated determinations of speed and/or cyclic delay parameter. Repeated determinations of speed and associated cyclic delay parameter (and subsequent transmission of the cyclic delay parameter) may allow the base station 104 and the mobile device 108 to adapt CDD in wireless transmissions to real-time conditions. This adaptation may be performed without computational expensive determinations of instantaneous channel conditions.

While the embodiments discussed above contemplate the mobile device 108 determining the cyclic delay parameter and transmitting the determined cyclic delay parameter to the base station 104; in other embodiments, the base station 104 may perform the cyclic delay parameter determination based on a speed determined by the mobile device 108 and fed back to the base station 104.

Furthermore, in some embodiments, the mobile device 108 may determine the cyclic delay parameter to be used in transmissions to the base station 104 by manners similar those described herein.

Figure 4:
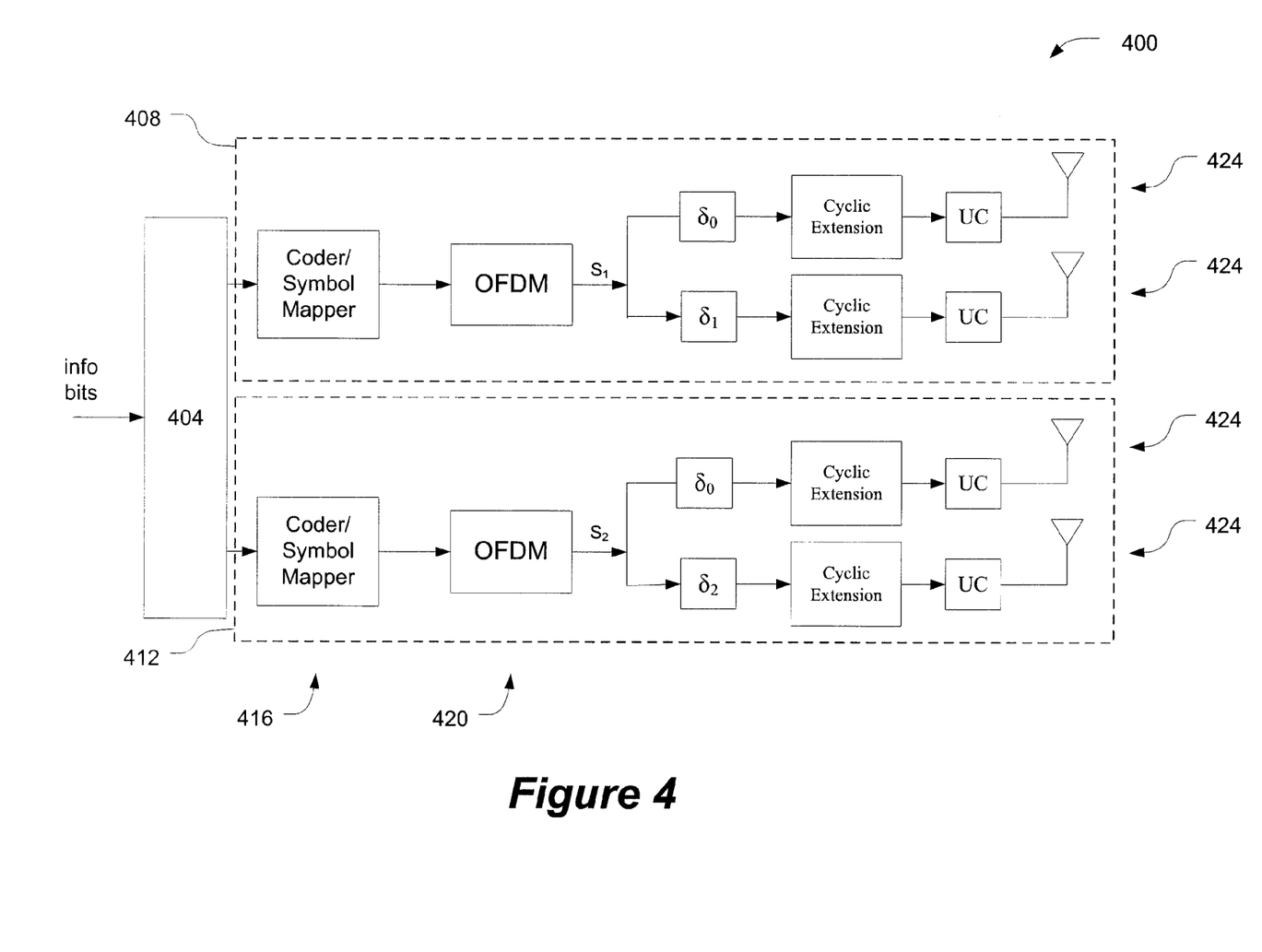
FIG. 4 illustrates another transmitter with CDD in accordance with various embodiments of the present invention.

FIG. 4 illustrates another transmitter 400 that may be used in place of transmitter 128 in accordance with various embodiments. The transmitter 400 may be a group selection per antenna rate control (GS-PARC) scheme configured to enhance multiple-input, multiple-output (MIMO) OFDM performance. The transmitter 400 may be compatible with $3^{rd}$ Generation Partnership Project (3GPP) Long Term Evolution (LTE) project, projected to result in release 8 of the Universal Mobile Telecommunications System (UMTS) technologies.

The transmitter 400 may have a demultiplexor 404 to distribute information bits between groups 408 and 412 within the transmitter 400. Each group may have a coder/symbol mapper 416, an OFDM module 420, and a number of transmit branches 424 (two in this embodiment), similar to the transmitter 200. For subsequent discussions, cyclic delay $\delta_1$ of group 408 may be assumed to be equal to cyclic delay $\delta_2$ of group 412.

In other embodiments, transmitters having other configurations may be employed. For example, in one embodiment, a variation of transmitter 400 may include a coder and interleaver before a demultiplexer, and the symbol mappers may be only on the outputs of the demultiplexor. Other variations may also be employed.

Figure 5:
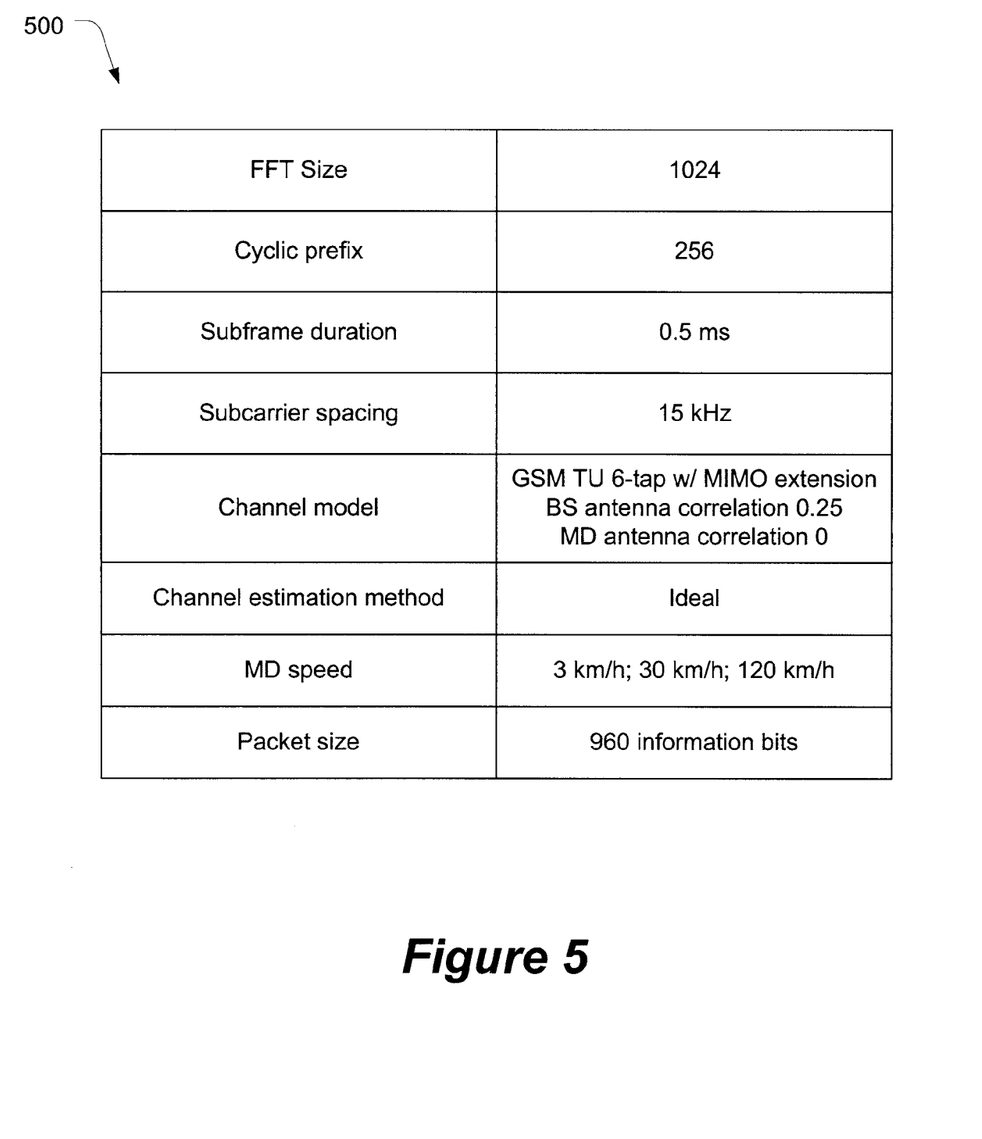
FIG. 5 is a table providing operating parameters in accordance with various embodiments of the present invention.

Table 500, shown in FIG. 5, provides various operating parameters for transmitter 400 that may be used in subsequent performance comparison descriptions. The operating parameters of table 500 may include an FFT size of 1024 samples; a cyclic prefix of 256 samples; a subframe duration of 0.5 milliseconds (ms); a subcarrier spacing of 15 kilohertz (kHz); a channel model that is a Global System for Mobile Communication (GSM) typical urban (TU) propagation model with a 6-tap delay line with MIMO extensions, a base station correlation of 0.25, and a mobile device correlation of 0; an ideal channel estimation method; mobile device speeds of 3 kilometer/hour (km/h), 30 km/h, and 120 km/h; and a transmit packet size of 960 information bits.

Figure 6:
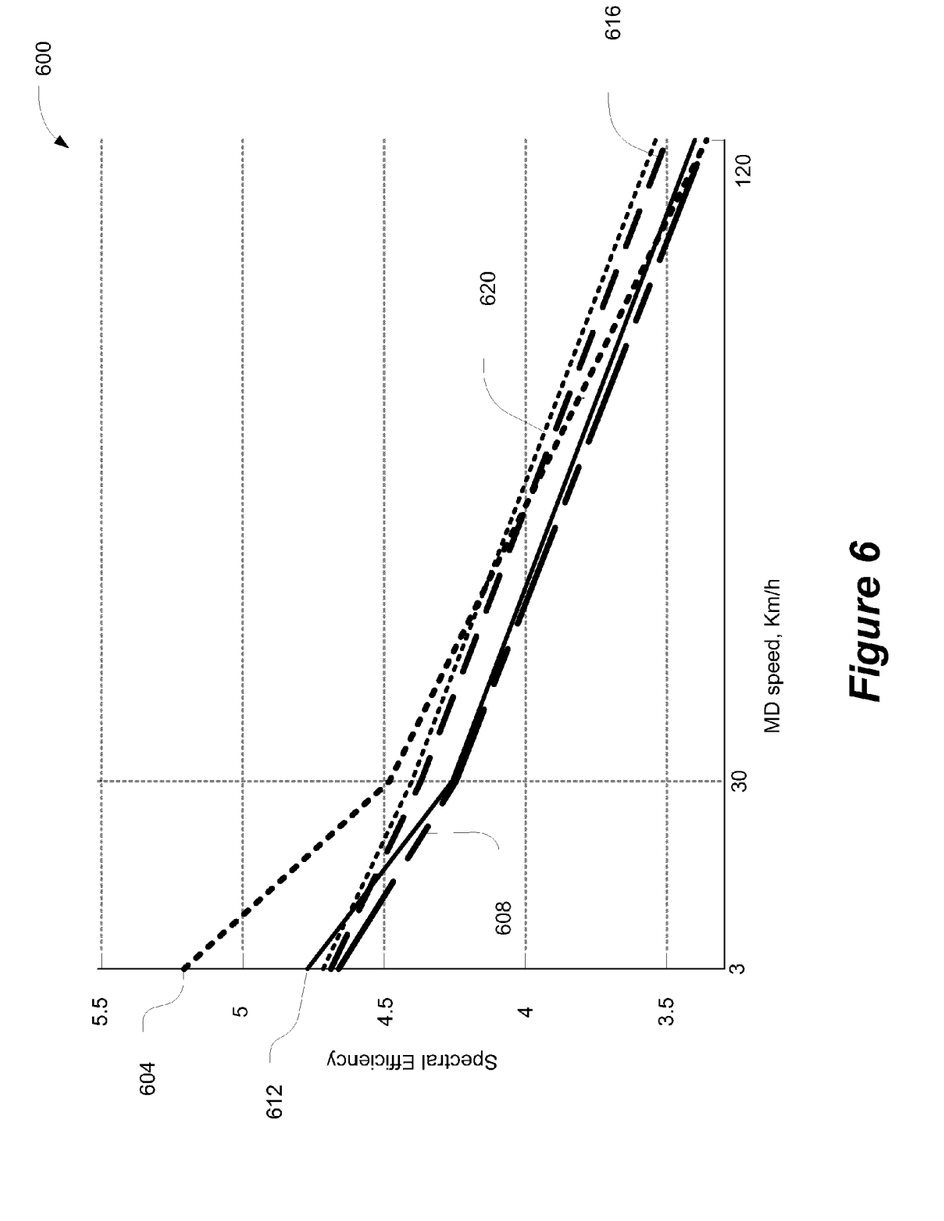
FIG. 6 is a chart illustrating throughputs of cyclic delays for given speeds of a mobile device in accordance with various embodiments of the present invention.

FIG. 6 is a chart 600 illustrating throughputs of cyclic delays for given speeds of the mobile device 108 in accordance with various embodiments. The chart 600 includes a first cyclic delay 604 of 8 IFFT samples; a second cyclic delay 608 of 16 IFFT samples; a third cyclic delay 612 of 22 IFFT samples; a fourth cyclic delay 616 of 38 IFFT samples; and a fifth cyclic delay 620 of 68 IFFT samples. The throughput comparisons of chart 600 may be through a channel having an SNR of 12.3 decibels (dB) and a code rate selection being fed back with a feedback delay of 2 subframes.

As can be seen by chart 600, the cyclic delay value resulting in the greatest throughput may be dependent on the speed of the mobile device 108. For example, for relatively low speeds, e.g., 3 km/h, the first cyclic delay 604 may have the greatest throughput. However, the fifth cyclic delay 620 may have higher throughputs for relatively high speeds, e.g., 120 km/h. This information correlating the speed, throughput, and cyclic delays may be modeled for a given platform and stored in the lookup table 152. The controller 136 may then be able to determine a cyclic delay resulting in desired throughput by accessing the information stored in the lookup table 152.

Figure 7:
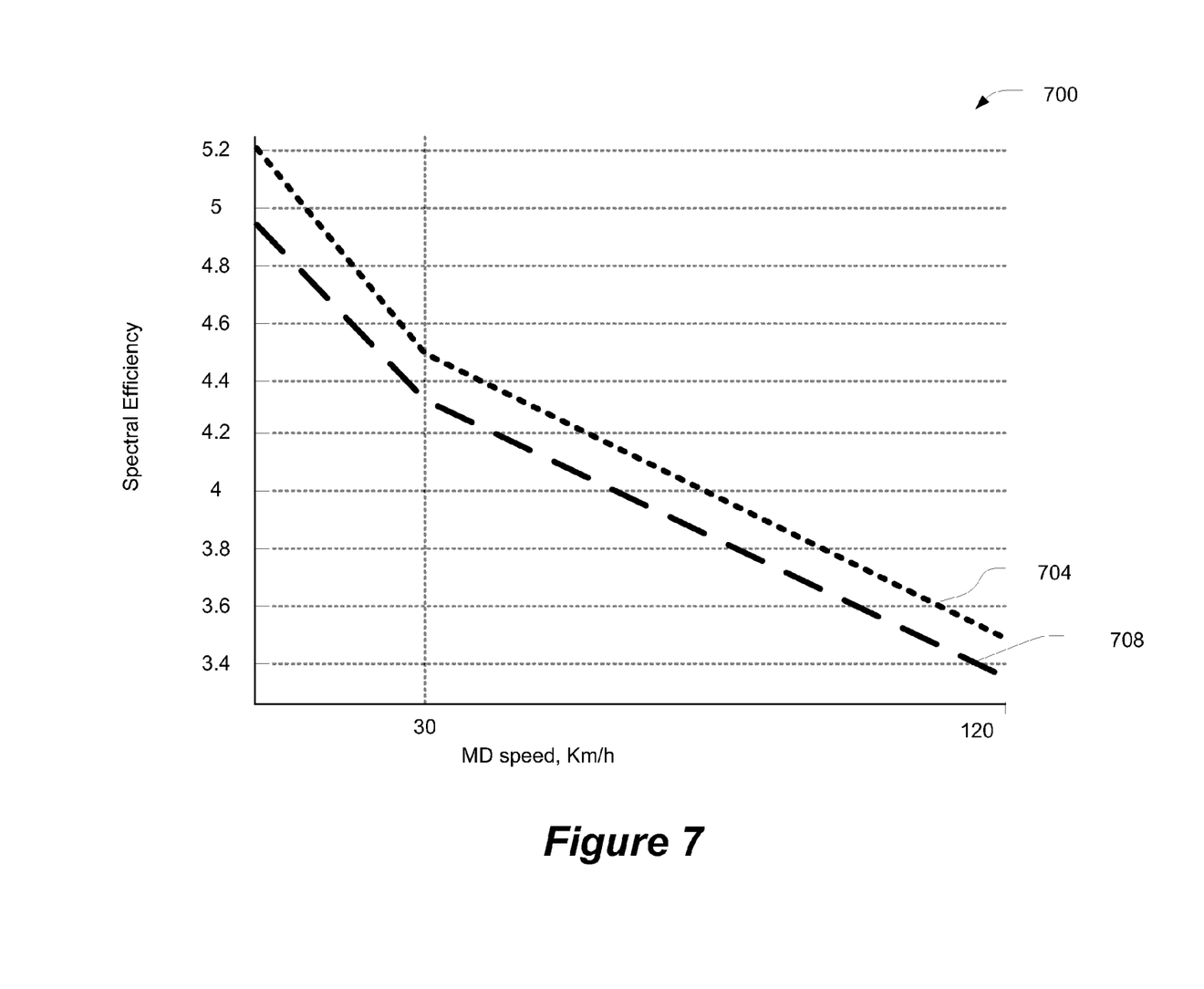
FIG. 7 is a chart illustrating a performance comparison in accordance with various embodiments of the present invention.

FIG. 7 is a chart 700 illustrating a performance comparison in accordance with various embodiments. In particular, the chart 700 illustrates a performance comparison between an adaptive CDD transmitter 704, utilizing various teachings presented herein, and a PARC transmitter 708 of the prior art. The spectral efficiency, which may be similar to the throughput measurement of FIG. 6, given in terms of bits/subframe/subcarrier over a range of mobile device 108 speeds is shown. As can be seen, the adaptive CDD transmitter 704 is shown to be more spectrally efficient than the fixed CDD transmitter 708 over the range of speeds of the mobile device 108. This increased spectral efficiency may result in an increase in the overall performance of a wireless communication system, e.g., system 100.

Figure 8:
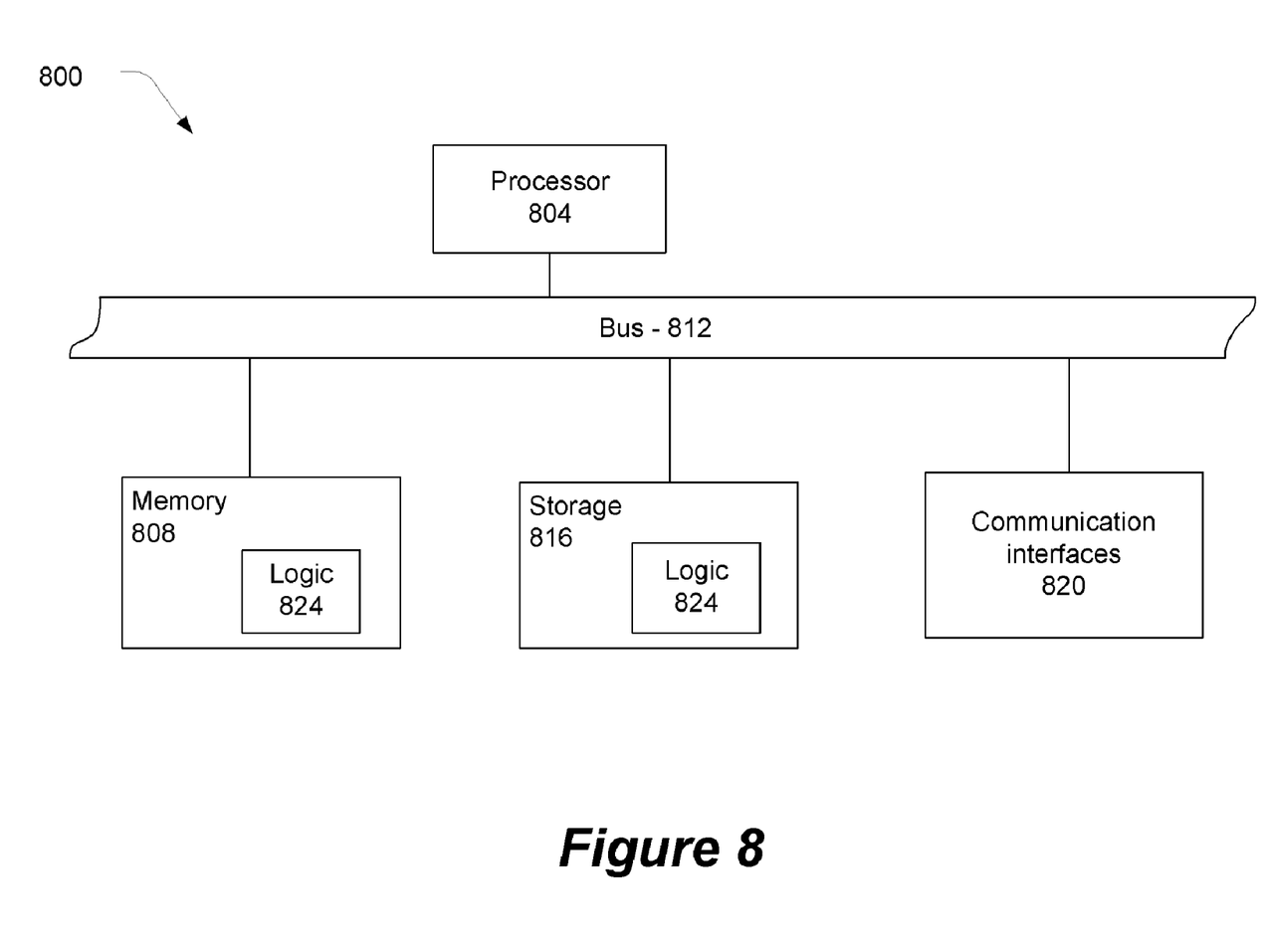
FIG. 8 illustrates a computing device in accordance with various embodiments of this invention.

FIG. 8 illustrates a computing device 800 capable of implementing a wireless network device in accordance with various embodiments. As illustrated, for the embodiments, computing device 800 includes processor 804, memory 808, and bus 812, coupled to each other as shown. Additionally, computing device 800 includes storage 816, and communication interfaces 820, e.g., a wireless network interface card (WNIC), coupled to each other, and the earlier described elements as shown.

Memory 808 and storage 816 may include in particular, temporal and persistent copies of CDD adaptation logic 824, respectively. The CDD adaptation logic 824 may include instructions that when accessed by the processor 804 result in the computing device 800 performing CDD adaptation operations described in conjunction with various wireless network devices in accordance with embodiments of this invention. These CDD adaptation operations include, but are not limited to, determining speed of a mobile device, determining cyclic delay parameter to be used in wireless transmissions, and/or transmitting determined speed and/or cyclic delay parameter to a wireless communication device.

In various embodiments, the memory 808 may include RAM, dynamic RAM (DRAM), static RAM (SRAM), synchronous DRAM (SDRAM), dual-data rate RAM (DDRRAM), etc.

In various embodiments, the processor 804 may include one or more single-core processors, multiple-core processors, controllers, application-specific integrated circuits (ASICs), etc.

In various embodiments, storage 816 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 816 may be a storage resource physically part of the computing device 800 or it may be accessible by, but not necessarily a part of, the computing device 800. For example, the storage 816 may be accessed by the computing device 800 over a network.

In various embodiments, computing device 800 may have more or less components, and/or different architectures. In various embodiments, computing device 800 may be a mobile device and/or a base station.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
   receiving a speed-determinative signal at a mobile device;
   determining a first speed at which the mobile device is traveling based at least in part on said speed-determinative signal;
   determining, by the mobile device, a first cyclic delay to be used to provide cyclic delay diversity (CDD) to wireless transmissions between a wireless communication device and the mobile device, said determining the first cyclic delay including accessing a lookup table for the first cyclic delay based at least in part on the first speed;
   transmitting, by the mobile device, the first cyclic delay to the wireless communication device;
   determining a second speed at which the mobile device is traveling;
   determining a second cyclic delay to be used in the wireless transmissions between the wireless communication device and mobile device based at least in part on the second speed;

determining that the second cyclic delay varies from the first cyclic delay; and transmitting the second cyclic delay based at least in part on said determining that the second cyclic delay varies from the first cyclic delay.

2. The method of claim 1, wherein the wireless transmissions are wireless transmissions from the wireless communication device to the mobile device.

3. An apparatus comprising:

one or more antennas;

a transceiver coupled to the one or more antennas and configured to communicatively couple the apparatus to one or more wireless communication devices over one or more wireless communication channels;

a controller, coupled to the transceiver, configured to:
  determine a first speed at which the apparatus is traveling;
  determine a first cyclic delay parameter to be used in wireless transmissions between a wireless communication device of the one or more wireless communication devices and the apparatus based at least in part on the first speed, wherein the first cyclic delay parameter is a cyclic delay or a phase rotation ramp;
  control the transceiver to transmit the first cyclic delay parameter to the wireless communication device;
  determine a second speed at which the apparatus is traveling;
  determine a second cyclic delay parameter to be used in the wireless transmissions between the wireless communication device and mobile device based at least in part on the second speed;
  determine that the second cyclic delay parameter varies from the first cyclic delay; and
  control the transceiver to transmit the second cyclic delay parameter based at least in part on said determining that the second cyclic delay parameter varies from the first cyclic delay parameter; and a lookup table configured to be accessed by the controller to determine the cyclic delay parameter based at least in part on the first speed.

4. The apparatus of claim 3, wherein the controller is further configured to repeatedly determine the speed at which the apparatus is traveling.

5. The apparatus of claim 4, wherein the controller is further configured to repeatedly determine the cyclic delay parameter to be used in wireless transmissions between the wireless communication device and the apparatus based at least in part on the repeatedly determined speed.

6. A method comprising:

receiving a speed-determinative signal at a mobile device;

determining a first speed at which the mobile device is traveling based at least in part on said speed-determinative signal;

determining, by the mobile device, a first cyclic delay to be used to provide cyclic delay diversity (CDD) to wireless transmissions between a wireless communication device and the mobile device, said determining the first cyclic delay including accessing a lookup table for the first cyclic delay based at least in part on the first speed;

transmitting, by the mobile device, the first cyclic delay to the wireless communication device;

determining a second speed at which the mobile device is traveling;

determining a second cyclic delay to be used in the wireless transmissions between the wireless communication device and mobile device based at least in part on the second speed;

determining that the second speed varies from the first speed by at least a predetermined magnitude; and determining the second cyclic delay based at least in part on said determining that the second speed varies from the first speed by at least the predetermined magnitude.

7. The method of claim 6, further comprising:

determining that the second cyclic delay varies from the first cyclic delay; and transmitting the second cyclic delay based at least in part on said determining that the second cyclic delay varies from the first cyclic delay.

* * * * *

UNITED STATES PATENT AND TRADEMARK OFFICE
CERTIFICATE OF CORRECTION

PATENT NO. : 7,978,780 B2  
APPLICATION NO. : 11/860321  
DATED : July 12, 2011  
INVENTOR(S) : Azizi et al.

Page 1 of 1

It is certified that error appears in the above-identified patent and that said Letters Patent is hereby corrected as shown below:

On the title page, item [75]:  
First Listed Inventor, "Shahmaz Azizi, Portland, OR (US)." should read --Shahraz Azizi, Portland, OR (US)--.

Signed and Sealed this  
Nineteenth Day of March, 2013

Teresa Stanek Rea  
*Acting Director of the United States Patent and Trademark Office*

UNITED STATES PATENT AND TRADEMARK OFFICE
CERTIFICATE OF CORRECTION

PATENT NO.        : 7,978,780 B2                                             Page 1 of 1
APPLICATION NO.   : 11/860321
DATED             : July 12, 2011
INVENTOR(S)       : Azizi et al.

It is certified that error appears in the above-identified patent and that said Letters Patent is hereby corrected as shown below:

On the title page, item [75]:
First Listed Inventor, "Shahmaz Azizi, Portland, OR (US)." should read --Shahrnaz Azizi, Portland, OR (US)--.

This certificate supersedes the Certificate of Correction issued March 19, 2013.

Signed and Sealed this
Eleventh Day of March, 2014

Michelle K. Lee
*Deputy Director of the United States Patent and Trademark Office*